(12) United States Patent
Aaltonen et al.

(10) Patent No.: US 8,935,340 B2
(45) Date of Patent: *Jan. 13, 2015

(54) INTERACTIVE COMMUNICATIONS SYSTEM

(75) Inventors: Janne Aaltonen, Turku (FI); Timo Ahopelto, Helsinki (FI)

(73) Assignee: Apple Inc., Cupertino, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/071,834

(22) Filed: Mar. 25, 2011

(65) Prior Publication Data

US 2011/0173282 A1 Jul. 14, 2011

Related U.S. Application Data

(63) Continuation of application No. 12/077,045, filed on Mar. 14, 2008, now Pat. No. 7,930,355, which is a continuation of application No. 11/888,850, filed on Aug. 2, 2007, now Pat. No. 7,730,149.

(30) Foreign Application Priority Data

Nov. 2, 2006 (GB) .................................. 0621874.7

(51) Int. Cl.
*G06F 13/00* (2006.01)
*H04L 12/58* (2006.01)

(52) U.S. Cl.
CPC ............ *H04L 12/5895* (2013.01); *H04L 51/38* (2013.01); *H04L 12/581* (2013.01); *H04L 51/04* (2013.01)
USPC ............ 709/206; 709/227; 709/228; 709/204

(58) Field of Classification Search
CPC ... H04L 12/5895; H04L 51/38; H04L 12/581; H04L 51/04
USPC .................................. 709/227, 228, 204–207
See application file for complete search history.

(56) References Cited

U.S. PATENT DOCUMENTS

| | | | |
|---|---|---|---|
| 5,408,519 | A | 4/1995 | Pierce et al. |
| 5,978,775 | A | 11/1999 | Chen |

(Continued)

FOREIGN PATENT DOCUMENTS

| | | |
|---|---|---|
| DE | 19941461 | 3/2001 |
| EP | 1 109 371 A2 | 6/2001 |

(Continued)

OTHER PUBLICATIONS

Communication pursuant to Article 94(3) EPC issued Mar. 10, 2011 by the European Patent Office in related European Application No. 07 822 138.9 (4 pages).

(Continued)

*Primary Examiner* — Kenneth Coulter
(74) *Attorney, Agent, or Firm* — Novak Druce Connolly Bove + Quigg LLP

(57) ABSTRACT

An interactive system and method for controlling access to a plurality of communications sessions involving a plurality of users including controlling access to a plurality of communications sessions, each of said communications sessions being for access by a plurality of users, wherein data identifying said plurality of communications sessions have been stored in association with data indicative of one or more characteristics thereof. The method includes receiving a request to initiate communications among members of a group of users, wherein said request includes data identifying the group of users, responsive to receiving said request, selecting a communications session on the basis of data identifying the group and at least some of said stored data indicative of characteristics of a given communications session, and transmitting messages to at least some members of the group. Each message has a message body including data providing access to the selected communications session and a destination address determined from data indicative of a given member of the group.

33 Claims, 3 Drawing Sheets

(56) References Cited

U.S. PATENT DOCUMENTS

| | | | |
|---|---|---|---|
| 5,978,833 A | 11/1999 | Pashley et al. | |
| 6,006,197 A | 12/1999 | d'Eon et al. | |
| 6,009,410 A | 12/1999 | LeMole et al. | |
| 6,023,700 A | 2/2000 | Owens et al. | |
| 6,097,942 A | 8/2000 | Laiho | |
| 6,286,005 B1 | 9/2001 | Cannon | |
| 6,564,261 B1 | 5/2003 | Gudjonsson et al. | |
| 6,820,204 B1 | 11/2004 | Desai et al. | |
| 6,920,326 B2 | 7/2005 | Agarwal et al. | |
| 7,039,599 B2 | 5/2006 | Merriman et al. | |
| 7,072,947 B1 | 7/2006 | Knox et al. | |
| 7,263,535 B2 | 8/2007 | Malik | |
| 7,730,017 B2 | 6/2010 | Nance et al. | |
| 7,730,149 B2 | 6/2010 | Aaltonen et al. | |
| 7,734,632 B2 | 6/2010 | Wang | |
| 7,774,419 B2 | 8/2010 | Aaltonen et al. | |
| 7,930,355 B2* | 4/2011 | Aaltonen et al. | 709/206 |
| 7,984,066 B1* | 7/2011 | Kilday et al. | 707/781 |
| 7,991,895 B2* | 8/2011 | Leppisaari et al. | 709/227 |
| 8,015,247 B1* | 9/2011 | Curry | 709/205 |
| 8,370,388 B2* | 2/2013 | Kilday et al. | 707/781 |
| 2002/0077130 A1 | 6/2002 | Owensby | |
| 2002/0137507 A1 | 9/2002 | Winkler | |
| 2002/0138291 A1 | 9/2002 | Vaidyanathan et al. | |
| 2002/0161770 A1 | 10/2002 | Shapiro et al. | |
| 2003/0023489 A1 | 1/2003 | McGuire et al. | |
| 2003/0028597 A1 | 2/2003 | Salmi et al. | |
| 2003/0037103 A1 | 2/2003 | Salmi et al. | |
| 2003/0040297 A1 | 2/2003 | Pecen et al. | |
| 2003/0040300 A1 | 2/2003 | Bodic et al. | |
| 2003/0197719 A1 | 10/2003 | Lincke et al. | |
| 2003/0220946 A1 | 11/2003 | Malik | |
| 2004/0019637 A1 | 1/2004 | Goodman et al. | |
| 2004/0068435 A1 | 4/2004 | Braunzell | |
| 2004/0107256 A1 | 6/2004 | Odenwald et al. | |
| 2004/0128353 A1 | 7/2004 | Goodman et al. | |
| 2004/0133480 A1 | 7/2004 | Domes | |
| 2004/0192359 A1 | 9/2004 | McRaild et al. | |
| 2004/0203761 A1 | 10/2004 | Baba et al. | |
| 2004/0209649 A1 | 10/2004 | Lord | |
| 2004/0240649 A1 | 12/2004 | Goel | |
| 2004/0259526 A1 | 12/2004 | Goris et al. | |
| 2005/0125397 A1 | 6/2005 | Gross et al. | |
| 2005/0160165 A1 | 7/2005 | Chen et al. | |
| 2005/0192008 A1 | 9/2005 | Desai et al. | |
| 2005/0233776 A1 | 10/2005 | Allen et al. | |
| 2006/0031327 A1 | 2/2006 | Kredo | |
| 2006/0053208 A1 | 3/2006 | Laurila et al. | |
| 2006/0053225 A1 | 3/2006 | Poikselka et al. | |
| 2006/0123014 A1 | 6/2006 | Ng | |
| 2006/0200460 A1 | 9/2006 | Meyerzon et al. | |
| 2006/0200461 A1 | 9/2006 | Lucas et al. | |
| 2006/0206586 A1 | 9/2006 | Ling et al. | |
| 2006/0212583 A1 | 9/2006 | Beadle et al. | |
| 2006/0276170 A1 | 12/2006 | Radhakrishnan et al. | |
| 2006/0276213 A1 | 12/2006 | Gottschalk | |
| 2006/0282328 A1 | 12/2006 | Gerace et al. | |
| 2006/0286963 A1 | 12/2006 | Koskinen et al. | |
| 2006/0288124 A1 | 12/2006 | Kraft et al. | |
| 2007/0027760 A1 | 2/2007 | Collins et al. | |
| 2007/0047523 A1 | 3/2007 | Jiang | |
| 2007/0061195 A1 | 3/2007 | Liu et al. | |
| 2007/0074262 A1 | 3/2007 | Kikkoji et al. | |
| 2007/0088801 A1 | 4/2007 | Levkovitz et al. | |
| 2007/0094066 A1 | 4/2007 | Kumar et al. | |
| 2007/0100805 A1 | 5/2007 | Ramer et al. | |
| 2007/0117571 A1 | 5/2007 | Musial | |
| 2007/0136457 A1 | 6/2007 | Dai et al. | |
| 2007/0136475 A1* | 6/2007 | Leppisaari et al. | 709/227 |
| 2007/0149208 A1 | 6/2007 | Syrbe et al. | |
| 2007/0260624 A1 | 11/2007 | Chung et al. | |
| 2008/0032703 A1 | 2/2008 | Krumm et al. | |
| 2008/0070579 A1 | 3/2008 | Kankar et al. | |
| 2008/0071929 A1 | 3/2008 | Motte et al. | |
| 2008/0091796 A1 | 4/2008 | Story | |
| 2008/0109519 A1 | 5/2008 | Aaltonen et al. | |
| 2008/0134043 A1 | 6/2008 | Georgis et al. | |
| 2008/0140508 A1 | 6/2008 | Anand et al. | |
| 2008/0235342 A1 | 9/2008 | Aaltonen et al. | |
| 2008/0244024 A1 | 10/2008 | Aaltonen et al. | |
| 2008/0271068 A1 | 10/2008 | Ou et al. | |
| 2008/0319836 A1 | 12/2008 | Aaltonen et al. | |
| 2009/0049090 A1 | 2/2009 | Shenfield et al. | |
| 2009/0063249 A1 | 3/2009 | Tomlin et al. | |
| 2009/0106111 A1 | 4/2009 | Walk et al. | |
| 2009/0125377 A1 | 5/2009 | Somji et al. | |
| 2009/0132395 A1 | 5/2009 | Lam et al. | |
| 2009/0216847 A1 | 8/2009 | Krishnaswamy et al. | |
| 2009/0287619 A1 | 11/2009 | Liang et al. | |
| 2009/0298483 A1 | 12/2009 | Bratu et al. | |
| 2010/0088152 A1 | 4/2010 | Bennett | |
| 2010/0114654 A1 | 5/2010 | Lukose et al. | |
| 2010/0125505 A1 | 5/2010 | Puttaswamy | |
| 2010/0161424 A1 | 6/2010 | Sylvain | |
| 2010/0169157 A1 | 7/2010 | Muhonen et al. | |
| 2010/0169176 A1 | 7/2010 | Turakhia | |
| 2010/0205541 A1 | 8/2010 | Rapaport et al. | |
| 2011/0087526 A1 | 4/2011 | Morgenstern et al. | |
| 2011/0302211 A1* | 12/2011 | Kilday et al. | 707/785 |

FOREIGN PATENT DOCUMENTS

| | | |
|---|---|---|
| EP | 1 220 132 A2 | 7/2002 |
| EP | 1 365 604 A2 | 11/2003 |
| EP | 1 455 511 A1 | 9/2004 |
| EP | 1587332 A1 | 10/2005 |
| EP | 1 615 455 A1 | 1/2006 |
| EP | 1 633 100 A1 | 3/2006 |
| FR | 2 867 931 A1 | 9/2005 |
| GB | 2 406 996 A | 4/2005 |
| JP | 2002140272 | 5/2002 |
| WO | WO 96/24213 | 8/1996 |
| WO | WO 00/44151 A2 | 7/2000 |
| WO | WO 01/22748 A1 | 3/2001 |
| WO | WO 01/31497 A1 | 5/2001 |
| WO | WO 01/52161 A2 | 7/2001 |
| WO | WO 01/57705 A1 | 8/2001 |
| WO | WO 01/58178 A2 | 8/2001 |
| WO | WO 01/65411 A1 | 9/2001 |
| WO | WO 01/69406 A1 | 9/2001 |
| WO | WO 01/71949 A1 | 9/2001 |
| WO | WO 01/72063 A1 | 9/2001 |
| WO | WO 01/91400 A2 | 11/2001 |
| WO | WO 01/93551 A2 | 12/2001 |
| WO | WO 01/97539 A2 | 12/2001 |
| WO | WO 02/31624 A2 | 4/2002 |
| WO | WO 02/054803 A1 | 7/2002 |
| WO | WO 02/069585 A1 | 9/2002 |
| WO | WO 02/075574 A1 | 9/2002 |
| WO | WO 02/084895 A1 | 10/2002 |
| WO | WO 03/015430 A1 | 2/2003 |
| WO | WO 03/019845 A2 | 3/2003 |
| WO | WO 03/024136 A1 | 3/2003 |
| WO | WO 03/088690 A1 | 10/2003 |
| WO | WO 2004/084532 A1 | 9/2004 |
| WO | WO 2004/086791 A1 | 10/2004 |
| WO | WO 2004/100521 A1 | 11/2004 |
| WO | WO 2005/029769 A1 | 3/2005 |
| WO | WO 2005/076650 A1 | 8/2005 |
| WO | WO 2006/002869 A1 | 1/2006 |
| WO | WO 2006/027407 A1 | 3/2006 |
| WO | WO 2006/093284 | 9/2006 |
| WO | WO 2006/093284 A1 | 9/2006 |
| WO | WO 2006/119481 A2 | 11/2006 |
| WO | WO 2008/013437 A1 | 1/2008 |
| WO | 2009/009507 | 1/2009 |
| WO | 2009/061914 | 5/2009 |
| WO | 2009/099876 | 8/2009 |

OTHER PUBLICATIONS

U.K. Further Search Report under Section 17 dated Jul. 25, 2007 issued in connection with corresponding U.K. Application No. GB0621874.7.

(56) References Cited

OTHER PUBLICATIONS

U.K. Search Report under Section 17 dated Jan. 2, 2008 issued in connection with corresponding U.K. Application No. GB0716954.3.
PCT International Preliminary Report on Patentability issued in related PCT Application No. PCT/EP2007/062792 by the International Bureau of WIPO dated May 5, 2009 (1 page).
PCT Written Opinion issued in related PCT Application No. PCT/EP2007/061792 by the International Searching Authority mailed May 5, 2009 (7 pages).
PCT International Search Report issued in related PCT Application No. PCT/EP2007/061792 by the International Searching Authority mailed Mar. 7, 2008 (3 pages).
Office Action issued from the U.S. Patent and Trademark Office dated Aug. 6, 2009 issued in related U.S. Appl. No. 12/077,089 (15 pages).
Office Action issued from the U.S. Patent and Trademark Office dated Aug. 18, 2009 issued in related U.S. Appl. No. No. 11/888,850 (9 pages).
Communication (Communication pursuant to Article 94(3) EPC) issued by the European Patent Office in connection with related European Patent Application No. 07 822 138.9 on Mar. 8, 2010 (3 pages).
Office Action dated Mar. 31, 2010 issued by the U.S. Patent Office in connection with related U.S. Appl. No. 12/077,089 (7 pages).
Notice of Allowance dated Apr. 2, 2010 issued by the U.S. Patent Office in connection with related U.S. Appl. No. 11/888,850 (11 pages).
Notice of Allowance issued May 20, 2010 by the U.S. Patent Office in connection with related U.S. Appl. No. 12/077,089 (9 pages).
"Advertisement System, Method and Computer Program Product", IP.com Prior Art Database Disclosure, Pub No. IPCOM000138557D, dated Jul. 24, 2006, IP.com, Amherst, NY, last visited Aug. 30, 2010)., Jul. 24, 2006.
"Office Action issued from USPTO", U.S. Appl. No. 12/077,045 (14 pages), Aug. 4, 2009.
"U.K.Search Report under Section 17", U.K. Application No. GB0621874.7, Feb. 23, 2007.
Internet Reference, , "Specific Media Behavioral Targeting Index", Specific Media, Inc., Irvine, CA, 2010, entered in case Apr. 12, 2012.
"Advertisement System, Method and Computer Program Product", IP.com Prior Art Database Disclosure, Pub No. IPCOM000138557D, dated Jul. 24, 2006, IP.com, Amherst, NY.
"Communication (Communication Pursuant to Article 94(3) EPC)", European Patent Office in connection with related European Patent Application No. 07 822 138.9 on Mar. 8, 2010 (3 pages), Mar. 8, 2010.
"Notice of Allowance", U.S. Patent Office in U.S. Appl. No. 11/888,850 (11 pages), filed Apr. 2, 2010.
"Office Action dated Apr. 15, 2010", U.S. Patent Office in connection with related U.S. Appl. No. 12/077,045 (14 pages), filed Apr. 15, 2010.
"Office Action dated Feb. 5, 2009", U.S. Appl. No. 12/077,089, filed Feb. 5, 2009.
"Office Action dated Mar. 31, 2010 issued by the USPTO", U.S. Appl. No. 12/077,089(7 pages), filed Mar. 31, 2010.
"Office Action issued from the USPTO dated Aug. 18, 2009", U.S. Appl. No. 11/888,850 (9 pages), filed Aug. 18, 2009.
"Office Action issued from the USPTO dated Aug. 4, 2009", U.S. Appl. No. 12/077,045 (14 pages), filed Aug. 4, 2009.
"Office Action issued from the USPTO dated Aug. 6, 2009", U.S. Appl. No. 12/077,089, filed Aug. 6, 2009.
"PCT International Preliminary Report on Patentability and Written Opinion", PCT Application No. PCT/EP2007/061792 by the International Bureau of WIPO (1 page), May 5, 2009.
"PCT International Search Report and Written Opinion issued in related PCT Application No. PCT/EP2007/061792", International Saerching Authority mailed Mar. 7, 2008.
"U.K. Further Search Report under Section 17", U.K . Application No. GB0621874.7, Jul. 25, 2007.
"U.K. Search Report Under Section 17", U.K Application GB0716954.3, Jan. 2, 2008.
"U.K. Search Report under Section 17", U.K. Application No. GB0621874.7, Feb. 23, 2007.
Internet Reference, , "Specific Media Behavioral Targeting Index", Specific Media, Inc., Irvine, CA, 2010.
Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.
Shaikh, Baber M. et al., "Customized User Segments for AD Targeting", IP.com Prior Art Database Disclosure, Pub No. IPCOM000185640D, dated Jul. 29, 2009 UTC, IP.com, Amherst, NY.

* cited by examiner

INTERACTIVE COMMUNICATIONS SYSTEM

CROSS-REFERENCE TO RELATED APPLICATIONS

This application is a Continuation of U.S. application Ser. No. 12/077,045 filed Mar. 14, 2008, now U.S. Pat. No. 7,930,355, which is a continuation of U.S. application Ser. No. 11/888,850 filed Aug. 2, 2007, now U.S. Pat. No. 7,730,149, which applications claim priority under 35 USC 119 of United Kingdom Application GB 0621874.7 filed Nov. 2, 2006, the entire disclosure of each of which is incorporated herein by reference.

FIELD OF THE INVENTION

The present invention relates to a method of, and system for, controlling access to a plurality of communications sessions involving a plurality of users, and is particularly, but not exclusively, suitable for allocating a group of users to a communications session based on a match between characteristics of a given communications session and characteristics associated with the group.

BACKGROUND INFORMATION

As is well known, communications networks provide a means for users to communicate with one or more other users. Users of a communication system are typically provided with numerous services, such as calls, data communication such as messaging and/or multimedia services, or simply provide users with a gateway to another network, such as the Internet. In relation to any one service, various communication systems, such as public switched telephone networks (PSTN), wireless communication systems, e.g. global system for mobile communications (GSM), general packet radio service (GPRS), universal mobile telecommunications system (UMTS), wireless local area network (WLAN) and so on, and/or other communication networks, such as an Internet Protocol (IP) network, may simultaneously be concerned in providing a connection. An end-user may access a communication network by means of any appropriate communication device, such as user equipment (UE), a mobile station (MS), a cellular phone, a personal digital assistant (PDA), a personal computer (PC), or any other equipment operable according to a suitable network protocol, such as a Session Initiation Protocol (SIP) or a wireless applications protocol (WAP) or a hypertext transfer protocol (HTTP). The user equipment may support, in addition to call and network access functions, other services, such as short message service (SMS), multimedia message service (MMS), electronic mail (email), Web service interface (WSI) messaging and voice mail and one-way messages such as WAP PUSH messages.

Communications services involving more than two users are generally referred to as group communications services, and include the "push-to-talk over cellular" (PoC) service also known as the PTT (push-to-talk service), the instant messaging (IM) service, IRC ("Internet Relay Chat"), and the ICQ ("I Seek You") service. In the case of the IM service, users are allowed to send messages to one or more in a list of predetermined users (a so-called "private list") in a conversational mode, and because they are transmitted "instantly", the transfer of messages back and forth is fast enough for participants to maintain an interactive conversation. The IRC service is a system for chatting that involves a set of rules and conventions and is implemented via client/server software. An IRC client can be downloaded to a user's computer, and the client is then used to connect to an IRC server in an IRC network to start or join an IRC chat group. The fourth group messaging application, ICQ ("I Seek You"), is a client application that provides information as to which "friends" and "contacts" are also online on the Internet, pages them, and operates so as to coordinate a "chat" session with them. The IM system is similarly arranged to generate alerts whenever a member of a given private list is online.

When designing a service, the objectives of the service provider—in terms of their effect on end users—have a significant bearing on the technology that is selected to support the service. For example, services that are designed to deliver information to a selected group of users (with a view to triggering a particular action to be taken on the part of the group members) make use of technology that is designed to match characteristics of the users with those of the information so as to improve the match between what the user receives and what the user wants to receive. Typically such information is delivered from a single source to many recipients, and any subsequent interactions proceed between the recipient and communications devices related to the information source.

As will be appreciated from the foregoing, in addition to transmitting information from one→one and one→many recipients, information can be distributed between members of a group so as to encourage discussion between—and thus impact on—group members, thereby increasing the effectiveness of the information. As described above and in international patent application having publication number WO2006/027407, known group communications methods involve discussions between predetermined or specified members of a group. Thus whilst known group communications services provide a means of increasing the impact of information on users, the extent of this impact is nevertheless limited to that achievable within a closed group of recipients.

SUMMARY OF THE INVENTION

In accordance with one aspect of the present invention, there is provided a method of controlling access to a communications session. Embodiments of the invention thus provide a means of selecting a communications session, or discussion forum, to host a group discussion between members of a group of users, and thus advantageously provide a means of controlling the context for discussion among the group members.

The members of the group are preferably notified of the selected communications session via a WAP message, which contains a link to the communications session, while selection of the communications session can be triggered by receipt of a short message—such as an SMS message—from a member of the group. The SMS message conveniently identifies the group and can contain a line of text or image that the member wants to pass on for discussion. Since the majority of terminals are capable of sending and receiving SMS and WAP messages, the terminals of participating group members do not need to have any bespoke software applications installed on their handsets in order to make use of the new service.

According to another aspect of the present invention there is provided a method which provides a means for groups of users to take part in communications sessions involving participants of a publicly accessible and interactive communications session, and thus provides a mechanism for information to be discussed and disseminated—in a particular period of time—by a wider audience than is possible with present methods.

Further features and advantages of the invention will become apparent from the following description of preferred embodiments of the invention, given by way of example only, which is made with reference to the accompanying drawings.

DETAILED DESCRIPTION

As described briefly above, embodiments of the invention are concerned with coordinating access to a communications session, specifically coordinating access by a predetermined group of terminals to one of a plurality of available communications sessions. Identification of the group members and the methods of providing members with access data for enabling access to the communications session will be described in detail later in the description, but first a description of the infrastructure needed to coordinate access to the communications session will be described.

Figure 1:
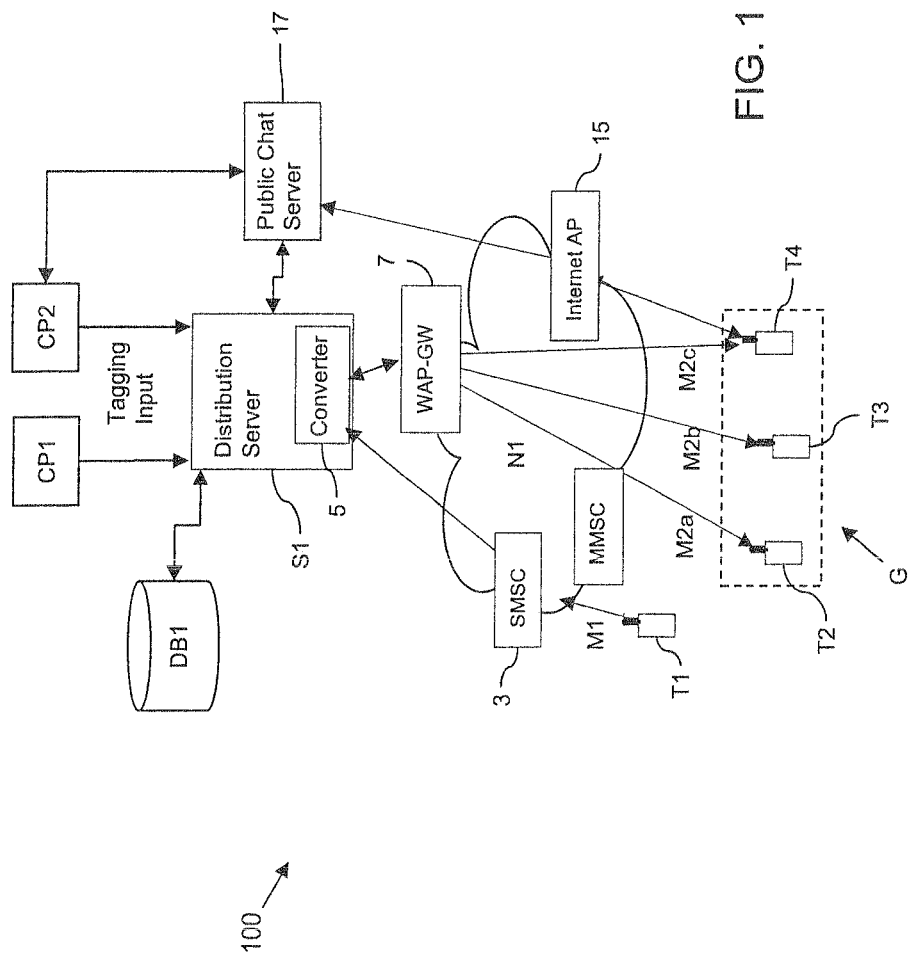
FIG. 1 is a schematic diagram showing a mobile network and network components arranged in accordance with an embodiment of the invention.

FIG. 1 shows an example of a data messaging system 100 within which embodiments of a first aspect of the invention operate; the arrows indicate data flows within the data messaging system 100 and the objects indicate components of the data messaging system 100. This Figure shows an arrangement of network components suitable for the delivery of WAP messages, Short Message (SMS messages), Multimedia messages (MMS messages), bespoke messages in the form of GPRS data and/or streamed data; as will be appreciated, the specific arrangement of the data messaging system 100 is dependent on the type of message being used to facilitate the coordination.

In the arrangement shown in FIG. 1, a terminal T1 communicates with various network devices within the data messaging system 100. The terminal T1 may be a wireless terminal such as a mobile phone, a PDA or a Laptop computer, or it may be a fixed terminal, e.g. in the form of a Personal Computer. In the arrangement shown in FIG. 1 the data messaging system 100 comprises: a WAP gateway 7, which is typically a network operator's WAP gateway; a distribution server S1; and a database DB1, arranged to store at least some of:

- data in respect of users of the data messaging system 100, including data identifying interests and characteristics of individual users and groups of users;
- data in respect of terminals such as terminals T1, T2, T3 and T4;
- data in respect of tagging content, including image (static, dynamic and/or interactive images), alphanumeric characters and content control information, the data having been provided by various content providers CP1, CP2; and
- communications sessions data in respect of communications sessions, including: data identifying sponsors; demographic requirements (in terms of types of users who are preferred participants of a given communications session); priority information; and status information (e.g. active, inactive etc.). The communications sessions, and thus sponsor, demographic and priority information, can be related to the content providers CP1, CP2.

In one arrangement the distribution server S1 and the database DB1 are located within a proprietary network, which means that they operate independently of any specific network operator and can be shared across a plurality of network operators. Using techniques known in the art, the database DB1 can store the preference and demographic data that are used to control selection of a communications session, or discussion forum, as described below.

Figure 2:
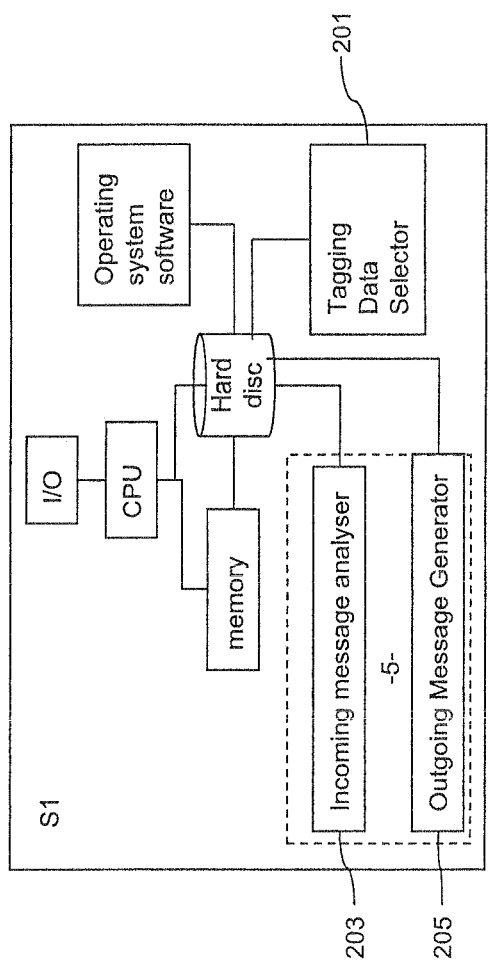
FIG. 2 is a schematic block diagram showing in detail the functionality associated with a distribution server shown in FIG. 1.
Figure 3:
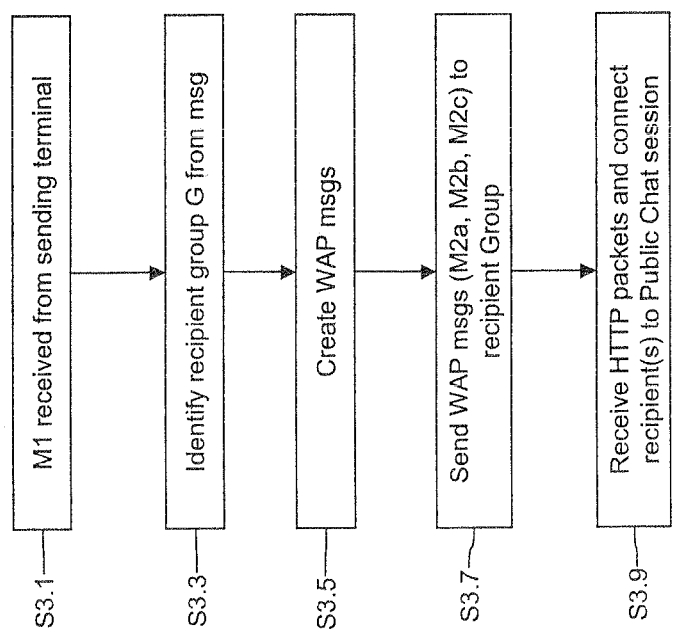
FIG. 3 is a schematic flow diagram showing a process for coordinating group participation in a communications session according to an embodiment of the invention.

The functionality of the distribution server S1 will now be described with reference to FIGS. 2 and 3. In addition to standard CPU, memory, data bus, Input/Output ports, data storage, and operating system programs, the distribution server S1 comprises certain bespoke functional components, namely:

- tagging data selector software component 201 for selecting tagging data from the database DB1;
- message analyser component 203 for identifying group members that are to be joined with the selected communications session; and
- outgoing message generator component 205 for selecting a communications session to which the group members are to be joined and for creating messages that include access data enabling recipients of a given message to join the selected communications session.

In a first embodiment the incoming (or initiating or originating) message M1 is an SMS message originating from the terminal T1; the originating message M1 contains a message body and carries details of a group of recipients such that the incoming message analyser 203 can identify the group identifier from the message. In one arrangement, during message creation the sending terminal T1 prompts the sending subscriber to select a group from a preconfigured list of groups stored on the terminal T1, causing the terminal T1 to create an SMS message identifying the selected group and having a format compatible with the format requirements of the message analyser component 203. This arrangement presupposes that the message analyser component 203 has access to the predetermined groups and members thereof.

In an alternative arrangement, the user of the terminal T1 enters an identifier for a group manually within the content of the SMS message M1; for example groups could be identified by numbers or by special characters, such as: "% This is a group message", "#This is a group message", "&This is a group message", where first one would be forwarded to group identified with %, second with # and third with &. As for the first arrangement, the group members corresponding to a given character would be accessible to the message analyser component 203 (such special character definitions groups could be specified via web interface).

In a yet further arrangement, and instead of selecting a group identifier that relates to a predetermined set of group members, the sending terminal T1 could prompt the user to simply select "Group" from a list of possible message types, without selecting a specific group identity. In this arrangement the terminal T1 would create an SMS message identifying that message M1 is intended to spawn creation of a group message, but identification of the group members would be a process performed by the message analyser component 203, and thus in real time rather than based on any predetermined group lists. In a yet further arrangement the terminal could be configured to analyse the content of individual messages, and for those whose content is determined to be identical to that of other messages, the terminal could send out a single message with an identifier indicating the message to be of a group type.

The message M1 could include additional information entered at terminal T1, such as keywords identifying subject matter of particular interest at the time of sending the message, and these can be used by the tagging data selector 201 when selecting the communications session to which the group members are to be joined.

In any of these arrangements, the destination address of the SMS message M1 would be the network identity of the server S1.

For an arrangement in which individual messages are sent out to individual recipients (without analysis by the terminal T1 in the manner specified above), the message analyser component 203 would either be directly associated with SMSC 3, or the SMSC 3 would be provisioned with specific forwarding instructions in respect of individual recipients so as to ensure that the individual SMS messages M1 are forwarded to the server S1. Once received, the message analyser component 203 would analyse the content of individual messages so as to determine those having identical content, and deriving a group on the basis of the content of the messages M1.

It will be understood from the foregoing that the function of the message analyser component 203 is at least to derive the identities of group members to whom communications sessions invitations are to be sent. These process steps are indicated in FIG. 3 by S3.1 and S3.3.

Turning now to the creation of messages inviting group members to communications sessions, the outgoing message generator 205 is arranged to create individual invitation messages M2a, M2b, M2c, one for each member of the group identified by the message analyser component 203. In one embodiment these messages M2a, M2b, M2c are embodied as WAP messages; WAP is a convenient choice of format for the outgoing messages because it allows links such as URLs and the like to be included within a message, these being displayed as a selectable object on a recipient's terminal which, when selected, cause the terminal to retrieve data from the network address associated with the object.

As described above, embodiments of the invention are concerned with coordinating the joining of members of a group to a communications session, and the links that are inserted into a given WAP message M2a, M2b, M2c created by the outgoing message generator 205 include links to discussion forums and the like. Preferably at least some of the discussion forums are publicly accessible so that, in at least some embodiments, whilst a group identifier is used to select individuals to involve in a communications session, the communications session to which they are invited to attend is not limited to group members only. This differs significantly from conventional methods such as those described in international patent application having publication number WO06/027407, where the group identifier serves both to identify individuals to involve in a given discussion, and to define the participants in the discussion.

Selection of a communications session can be dependent on attributes such as keywords specified in the initiating message M1 (if available), and/or time of receipt of the initiating message M1, and/or profile data corresponding to the group and/or one or more of the identified group members. Accordingly, upon receipt of the group member identities, the outgoing message generator 205 is arranged to access the database DB1 and retrieve interests and preference data corresponding to at least some of the group and/or individual group members, and to compare these data with attributes of currently active and accessible communications sessions. The attributes of a given communications session include a set of demographic requirements, these having been specified by the host of a given communications session and being matched against the preference and interests data corresponding to individuals of the group G (or the group itself), thereby effectively controlling which types of groups are allowed to access a given communications session. In addition the attributes can include priority information, this having been specified or negotiated by a content provider CP1, CP2 (for example) and being used by the outgoing message generator 205 when selecting a specific communications session from those available.

Figure 4:
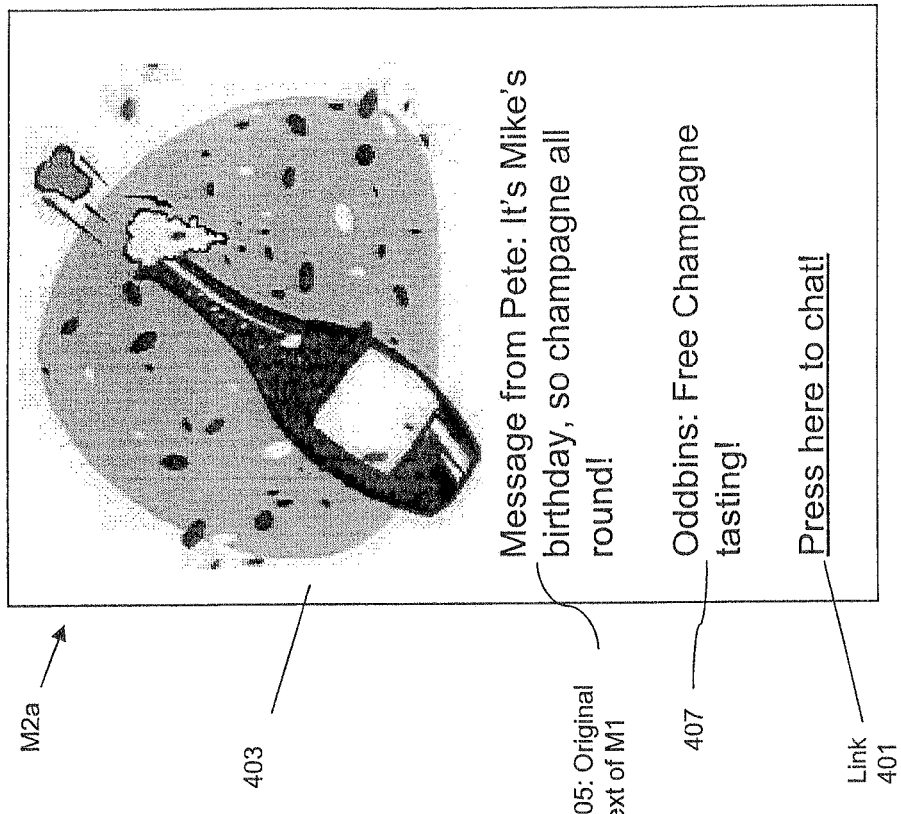
FIG. 4 is a schematic diagram showing an example of an outgoing message created by the distribution server shown in FIG. 2.

An example outgoing, or invitation, message M2a including a link 401 to a communications session is shown in FIG. 4: the link 401 is embodied as a selectable object and is identifiable from the text "Press here to chat!"

The outgoing message generator 205 can also cooperate with the tagging data selector software component 201 so as to select and insert information tags (such as those identified by reference numerals 403, 407) into the invitation messages M2a, M2b, M2c. The tagging software component 201 is arranged to select image and/or text and/or audio and/or video tagging data on the basis of demographic data corresponding to one or more of the identified group members and from the repository of tagging data stored in the database DB1 and/or the text contained within the initiating message M1. For the example shown in FIG. 4, it can be seen that the text 405 of the initiating message M1 has been used to select both the image tag 403 and the text tag 407: the invitation messages M2a, M2b, M2c include the text 405 included in the initiating message M1, together with information as to the origins of the invitation messages M2a, M2b, M2c ("Message from Pete . . . ") thereby providing suitable context for the tag data 403, 407 when the invitation message M2a is reviewed by a recipient. The foregoing message creation process is indicated generally in FIG. 3 at step S3.5.

In view of the fact that the tags 403, 407 are included with the link to the selected communications session, it will be appreciated that these tags 403, 407 can be used to steer group discussions within the communications session towards the subject matter of the tagging data, for example with incentives in the event that any participant of the group communications session purchase certain goods—from certain providers—during the communications session (or within a specified period thereafter).

Furthermore, since the link 401 is the trigger for the IM chat session, the tags 403, 407 accompanying the link 401 essentially serve to announce or promote the selected communications session. Thus in at least some embodiments, the data to be selected for inclusion in a given message are advertisement data, and in the case of the advertisement data relating directly or indirectly to the communications session associated with the link 401, the tags 403, 407 could identify a sponsor thereof.

Once the WAP messages M2a, M2b, M2c have been created, they are sent to the recipients identified at step S3.3 via the WAP gateway 7 (step S3.7), as is known in the art. It is to be noted that whilst not shown in FIG. 1, a WAP message is also preferably sent to the terminal T1 from which the initiating message M1 was received (in this example, Pete's terminal).

The transmission of the WAP messages M2a M2c marks the end of the involvement of the distribution server S1, since selection of the link 401 is transmitted to network components associated with the link, and this process is independent of the distribution server 51. Thus, if activation of the link 401 results in a HTTP request message to be transmitted to a web server running an IM chat session for example, subsequent messages would be transmitted in accordance with IM and its associated protocols (step S3.9).

Whilst in the embodiments described above the message M1 is an SMS message, it is to be understood that message M1 could alternatively be a USSD, MMS, email or any other type of message capable of identifying a group of recipient terminals. Similarly, whilst in the above embodiments the outgoing messages are embodied as PUSH WAP messages, they could alternatively be embodied as MMS messages, SMS messages with link in text form, bookmarks to mobile terminal, e-mail, voice call, broadcast message using cellular networks (such as Multimedia Broadcast/Multicast Service (MBMS) over Wideband Code Division Multiple Access (WCDMA)) or broadcast messages using broadcast networks (such as Digital Video Broadcast—Handheld (digital TV) (DVB-H), Integrated Services Digital Broadcasting—Terrestrial (ISDB-T), Digital Audio Broadcasting (DAB), Forward Link Only (Qualcomm) (Flo), Digital Multimedia Broadcasting (DMB), Radio Data Service (RDS) channel of radio network to mention few), any multicast or broadcast IP session indicator protocol.

In the above embodiments, access to a communications session is described in relation to a single group. However, selection of a communications session could be made on the basis of the identity—and thus demographic data—corresponding to groups that have already been notified of a communications session. Thus in addition to reviewing priority and demographic requirements of a given communications session, the outgoing message generator 205 could be arranged to review the identity of groups to whom invitation messages have previously been sent, and compare the demographic data between the respective groups in order to select a communications session for the subsequently requesting group members.

The above embodiments are to be understood as illustrative and non-limiting examples of the invention, which is concerned with facilitating access to discussion forums by predetermined groups of users. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method comprising:
receiving, by a processor, a request from a terminal to coordinate access to one of a plurality of available communications sessions, the request including data identifying at least a user of the terminal, wherein a communications session is an active group discussion, regarding a specified topic, between a group of users including at least one user not identified by the data identifying at least a user of the terminal;
accessing, by the processor, a database to identify group members based on the data identifying at least the user of the terminal, wherein the database contains data in respect of users of a data messaging system, the data identifying demographic data, interests and characteristics of individual users and groups of users;
selecting, by the processor, a first communications session from the plurality of available communications sessions based on the data identifying at least the user of the terminal, a time of receipt of the request, and a first specified topic associated with the first communication session; and
transmitting, by the processor, a message to the terminal of each user identified by the data identifying at least the user of the terminal, the message having a message body comprising data providing access to the selected communications session and a destination address determined from data identifying at least the user of the terminal.

2. The method of claim 1, wherein the data identifying at least the user of the terminal is a group ID which corresponds to a group of users in the database and the group members are identified corresponding thereto.

3. The method of claim 1, wherein the data identifying at least the user of the terminal is keywords and group members are identified that have preference data corresponding to the keywords.

4. The method of claim 1, wherein the database further contains communications sessions data identifying attributes of each of the plurality of available communications sessions.

5. The method of claim 4, wherein one of the plurality of available communications sessions is selected by comparing the data in respect of the identified users with the data identifying attributes of each of the plurality of available communications sessions.

6. The method of claim 5, wherein the demographic requirements for users to access the communications session are specified by a host of the given communications session.

7. The method of claim 5, wherein the communications session is selected by matching preference data associated with the identified members of the group with preference data associated with the predetermined communications sessions.

8. The method of claim 4, wherein the data identifying attributes of each of the plurality of available communications session indicates whether the communications session is active.

9. The method of claim 4, wherein the data identifying attributes of each of the plurality of available communications sessions includes priority information and the communications session is selected based on the priority information.

10. The method of claim 1, wherein the communications session is selected from a list of predetermined communications sessions.

11. The method of claim 1, wherein each message contains a selectable link to the selected communications session.

12. A system comprising:
a processor; and
a memory containing instructions that, when executed, cause the processor to:
receive, a request from a terminal to coordinate access to one of a plurality of available communications sessions, the request including data identifying at least a user of the terminal, wherein a communications session is an active group discussion, regarding a specified topic, between a group of users including at least one user not identified by the data identifying at least a user of the terminal;
access a database to identify group members based on the data identifying at least the user of the terminal, wherein the database contains data in respect of users of a data messaging system, the data identifying demographic data, interests and characteristics of individual users and groups of users;

select a first communication session from the plurality of available communications sessions based on the data identifying at least the user of the terminal, a time of receipt of the request, and a first specified topic associated with the first communication session; and transmit messages to the terminal of each user identified by the data identifying at least the user of the terminal, each message having a message body comprising data providing access to the selected communications session and a destination address determined from the data identifying at least the user of the terminal.

13. The system of claim 12, wherein the data identifying at least the user of the terminal is a group ID which corresponds to a group of users in the database and the group members are identified corresponding thereto.

14. The system of claim 12, wherein the data identifying at least the user of the terminal is keywords and group members are identified that have preference data corresponding to the keywords.

15. The system of claim 12, wherein the database further contains communications sessions data identifying attributes of each of the plurality of available communications sessions.

16. The system of claim 15, wherein one of the plurality of available communications sessions is selected by comparing the data in respect of the identified users with the data identifying attributes of each of the plurality of available communications sessions.

17. The system of claim 16, wherein the demographic requirements for users to access the communications session are specified by a host of the given communications session.

18. The system of claim 16, wherein the communications session is selected by matching preference data associated with the identified members of the group with preference data associated with the predetermined communications sessions.

19. The system of claim 15, wherein the data identifying attributes of each of the plurality of available communications session indicates whether the communications session is active.

20. The system of claim 15, wherein the data identifying attributes of each of the plurality of available communications sessions includes priority information and the communications session is selected based on the priority information.

21. The system of claim 12, wherein the communications session is selected from a list of predetermined communications sessions.

22. The system of claim 12, wherein each message contains a selectable link to the selected communications session.

23. A non-transitory computer readable medium having computer executable instructions stored thereon that, when executed by a computing device, cause the computing device to:

receive a request from a terminal to coordinate access to one of a plurality of available communications sessions, the request including data identifying at least a user of the terminal, wherein a communications session is an active group discussion, regarding a specified topic, between a group of users including at least one user not identified by the data identifying at least a user of the terminal;

access a database to identify group members based on the data identifying at least the user of the terminal, wherein the database contains data in respect of users of a data messaging system, the data identifying demographic data, interests and characteristics of individual users and groups of users;

select a first communication session from the plurality of available communications sessions based on the data identifying at least the user of the terminal, a time of receipt of the request, and a first specified topic associated with the first communication session; and transmit a message to the terminal of each user identified by the data identifying at least the user of the terminal, the message having a message body comprising data providing access to the selected communications session and a destination address determined from data identifying at least the user of the terminal.

24. The non-transitory computer readable medium of claim 23, wherein the data identifying at least the user of the terminal is a group ID which corresponds to a group of users in the database and the group members are identified corresponding thereto.

25. The non-transitory computer readable medium of claim 23, wherein the data identifying at least the user of the terminal is keywords and group members are identified that have preference data corresponding to the keywords.

26. The non-transitory computer readable medium of claim 23, wherein the database further contains communications sessions data identifying attributes of each of the plurality of available communications sessions.

27. The non-transitory computer readable medium of claim 26, wherein one of the plurality of available communications sessions is selected by comparing the data in respect of the identified users with the data identifying attributes of each of the plurality of available communications sessions.

28. The non-transitory computer readable medium of claim 27, wherein the demographic requirements for users to access the communications session are specified by a host of the given communications session.

29. The non-transitory computer readable medium of claim 27, wherein the communications session is selected by matching preference data associated with the identified members of the group with preference data associated with the predetermined communications sessions.

30. The non-transitory computer readable medium of claim 26, wherein the data identifying attributes of each of the plurality of available communications session indicates whether the communications session is active.

31. The non-transitory computer readable medium of claim 26, wherein the data identifying attributes of each of the plurality of available communications sessions includes priority information and the communications session is selected based on the priority information.

32. The non-transitory computer readable medium of claim 23, wherein the communications session is selected from a list of predetermined communications sessions.

33. The non-transitory computer readable medium of claim 23, wherein each message contains a selectable link to the selected communications session.

* * * * *